J. M. BURTON.
TURBINE FOR WATER METERS.
APPLICATION FILED OCT. 26, 1910.

983,535.

Patented Feb. 7, 1911.

Attest:

Inventor:
James M. Burton
by Redding, Greeley & Austin
Atty

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

TURBINE FOR WATER-METERS.

983,535.  Specification of Letters Patent.  Patented Feb. 7, 1911.

Application filed October 26, 1910. Serial No. 589,114.

*To all whom it may concern:*

Be it known that I, JAMES M. BURTON, a citizen of the United States, residing in Long Island City, in the borough of Queens of the city of New York, in the State of New York, have invented certain new and useful Improvements in Turbines for Water-Meters, of which the following is a specification, reference being had to the accompanying drawings, forming a part hereof.

This invention relates particularly to the construction of the measuring or turbine wheels of water meters. Such wheels are usually formed of hard rubber or other suitable material with helical slots cut or molded in the periphery thereof so that in the passage of the water or other liquid through such slots the wheel is rotated with a velocity proportional to the flow of water or other liquid, the wheel being made to drive the recording mechanism or register through suitable connections.

The object of the present invention is to reduce the cost of construction of such wheels and also to improve the construction thereof especially with a view to providing a greater number of surfaces upon which the liquid may act to rotate the wheel while preserving the strength, rigidity and lightness of the wheel.

In accordance with the invention the wheel is formed preferably of a flanged disk of sheet metal and helical blades of sheet metal secured to the peripheral surface of the flange, such blades being preferably formed as hollow blades with their ends open so as to secure the necessary rigidity without undue weight and at the same time to secure better action of the liquid upon the impelling surfaces.

The invention will be more fully explained hereinafter with reference to the accompanying drawing in which it is illustrated, and in which—

Figure 1:
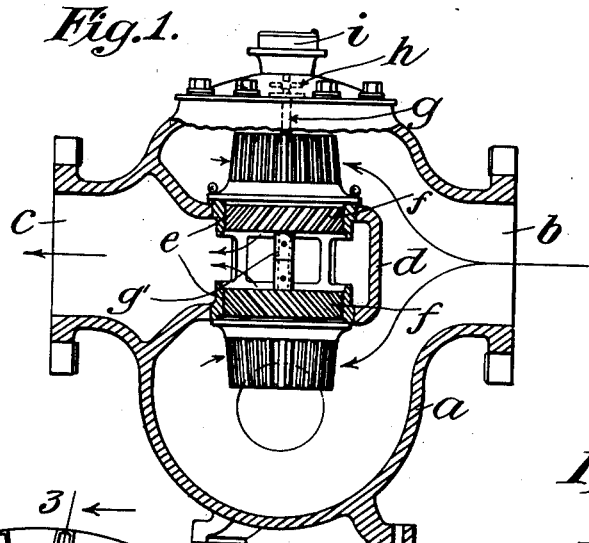
Figure 2:
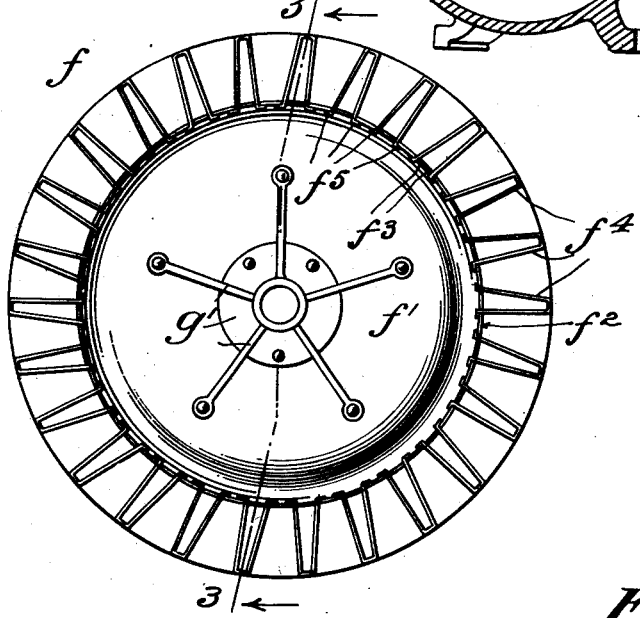
Figure 3:
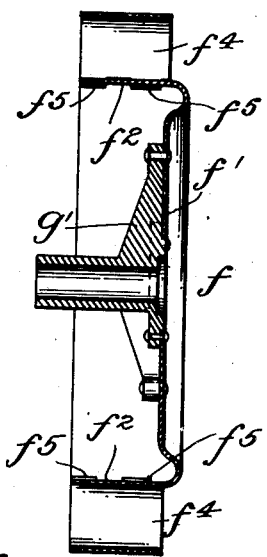
Figure 4:
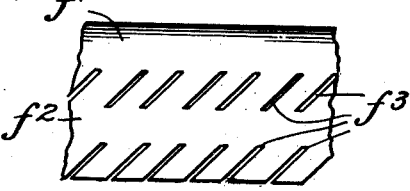
Figure 5:
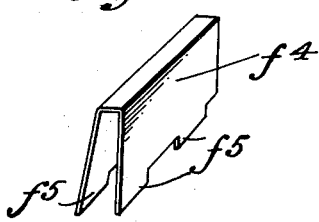

Figure 1 is a view in vertical section of a meter with wheels of the improved construction in position therein. Fig. 2 is a plan view of one of the improved wheels. Fig. 3 is a view in diagrammatical section in the plane indicated by the line 3—3 of Fig. 2. Figs. 4 and 5 are views showing details of construction.

The improved measuring wheel or turbine is capable of application to any meter in which a turbine measuring wheel may be employed.

In Fig. 1 of the drawings is shown a meter of well known construction comprising a shell $a$ provided with an inlet $b$ and an outlet $c$, and a tubular wall $d$ between the inlet and the outlet, and provided in its upper and lower surfaces with openings $e$, $e$, in which are located balanced measuring wheels or turbines $f$ which are secured to a spindle $g$. The latter is mounted in suitable bearings and, through suitable gearing $h$, drives the recording mechanism or register $i$. Each measuring wheel $f$ comprises a body and helical blades secured thereto. The body consists of a disk $f'$ which is secured to the spindle $g$ by a suitable spider $g'$ and may be corrugated to secure stiffness, and a flange $f^2$, the body of the wheel thus being an open cup-shaped body. In the flange $f^2$ are formed narrow, obliquely disposed slots $f^3$ for the convenient attachment to the body of the helical blades $f^4$. Each of such blades is preferably formed of sheet metal bent to form a hollow blade with open ends and, for convenience in attachment to the body of the wheel, is provided with lugs or tongues $f^5$ which may be inserted in the slots $f^3$ and thereafter upset so as to hold the blades firmly in position, the blades and the body being also soldered or brazed together if necessary to secure a firm union.

It will now be seen that the improved wheel not only can be manufactured at small expense but combines the necessary strength, stiffness and lightness. Furthermore, the flow of the liquid being in a direction parallel with the axis of the wheel, the hollow blades, open at the ends, afford nearly double the area of impelling surface afforded by a solid blade, while the provision of closed passages through the blades, open only at the ends, is believed to secure a better action of the liquid rotating the wheel at the same velocity for a given rate of flow.

It will be understood that the details of construction of the improved wheel may be varied to suit different conditions of use without departing from the spirit of the invention, which is not limited to the particular construction shown and described herein.

I claim as my invention:

1. A turbine wheel for water meters, comprising a body of sheet metal provided with a peripheral flange and blades secured to the periphery of the flange.

2. A turbine wheel for water meters, comprising a body of sheet metal provided with a peripheral flange and helical blades of sheet metal secured to the periphery of the flange.

3. A turbine wheel for water meters, comprising a body of sheet metal provided with a peripheral flange and helical hollow blades of sheet metal secured to the periphery of the flange and open at the ends thereof.

4. A turbine wheel for water meters, comprising a body of sheet metal with a peripheral flange, said flange having obliquely disposed slots, and blades of sheet metal having lugs or tongues to coöperate with the slots in the flange.

This specification signed and witnessed this twenty fourth day of October, A. D. 1910.

JAMES M. BURTON.

Signed in the presence of—
HAROLD R. WILFORD.
J. HENRY TAHRS.